United States Patent
Murakami

(10) Patent No.: US 9,055,340 B2
(45) Date of Patent: Jun. 9, 2015

(54) APPARATUS AND METHOD FOR RECOMMENDING INFORMATION, AND NON-TRANSITORY COMPUTER READABLE MEDIUM THEREOF

(75) Inventor: Tomoko Murakami, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 181 days.

(21) Appl. No.: 13/413,767

(22) Filed: Mar. 7, 2012

(65) Prior Publication Data
US 2012/0246161 A1 Sep. 27, 2012

(30) Foreign Application Priority Data

Mar. 24, 2011 (JP) .............................. P2011-065265

(51) Int. Cl.
G06F 17/30 (2006.01)
H04N 21/475 (2011.01)
H04N 21/25 (2011.01)
H04N 21/2668 (2011.01)
H04N 21/482 (2011.01)
H04N 21/658 (2011.01)

(52) U.S. Cl.
CPC ......... H04N 21/4755 (2013.01); H04N 21/252 (2013.01); H04N 21/2668 (2013.01); H04N 21/4826 (2013.01); H04N 21/6582 (2013.01)

(58) Field of Classification Search
CPC .............. G06F 17/30598; G06F 19/24; G06F 17/30601; G06F 17/30705; H04L 67/306
See application file for complete search history.

(56) References Cited

U.S. PATENT DOCUMENTS

| | | | |
|---|---|---|---|
| 2004/0054572 A1* | 3/2004 | Oldale et al. ..................... | 705/10 |
| 2007/0038659 A1* | 2/2007 | Datar et al. .................. | 707/101 |
| 2008/0261516 A1* | 10/2008 | Robinson ..................... | 455/3.06 |
| 2008/0294584 A1* | 11/2008 | Herz .............................. | 706/46 |
| 2009/0112837 A1* | 4/2009 | Modani et al. .................... | 707/5 |
| 2011/0314122 A1* | 12/2011 | Shyamkumar et al. ....... | 709/217 |

FOREIGN PATENT DOCUMENTS

| | | |
|---|---|---|
| JP | 2007-318364 | 12/2007 |
| WO | 2004100033 | 11/2004 |

OTHER PUBLICATIONS

Japanese Office Action for Japanese Application No. 2011-065265 mailed on Aug. 22, 2014.

* cited by examiner

*Primary Examiner* — Yuk Ting Choi
(74) *Attorney, Agent, or Firm* — Amin, Turocy & Watson, LLP

(57) ABSTRACT

According to one embodiment, profile information of new user and items to be selected are inputted. Each item has an attribute value of a plurality of attributes. Profile information and preference information of a plurality of users are acquired. The preference information represents whether each user has selected each item. The plurality of users is classified into a plurality of clusters by the profile information and the preference information of the plurality of users. A parameter of each attribute of each cluster is calculated by the preference information of each cluster. A similar cluster to classify the new user is estimated from the plurality of clusters by the profile information of the new user. A preference degree of each item is calculated by the parameter of each attribute of the similar cluster and the attribute value of each item. An item to be recommended is decided by the preference degree.

11 Claims, 14 Drawing Sheets

| USER \ CONTENT | Oc | St | Pr | Ko | Fi | Su | Ga | AGE | SEX DISTINCTION | CLUSTER | |
|---|---|---|---|---|---|---|---|---|---|---|---|
| A | 1 | 1 | 0 | 0 | 0 | 0 | 0 | 20 | F | 1 | |
| D | 1 | 1 | 0 | 0 | 1 | 0 | 1 | 20 | F | 1 | CLUSTER 1 |
| B | 0 | 1 | 1 | 1 | 0 | 0 | 0 | 30 | F | 1 | |
| C | 0 | 1 | 1 | 1 | 0 | 0 | 0 | 40 | F | 2 | CLUSTER 2 |
| F | 0 | 0 | 1 | 1 | 0 | 1 | 0 | 30 | F | 2 | |
| G | 1 | 0 | 0 | 0 | 1 | 1 | 1 | 50 | M | 3 | CLUSTER 3 |
| N | 1 | 0 | 0 | 0 | 1 | 0 | 1 | 30 | M | 3 | |

Q. PLEASE SELECT YOUR SEX DISTINCTION.
  ◉ MALE
  ○ FEMALE

Q. PLEASE ANSWER YOUR AGE.
  ○ UNDER TEN
  ○ TEENS
  ◉ TWENTIES
  ○ THIRTIES
  ○ FOURTIES
  ○ FIFTIES
  ○ SIXTIES
  ○ OVER SEVENTIES

FIG. 5

| USER | AGE | SEX DISTINCTION |
|---|---|---|
| A | 20 | F |
| D | 20 | F |
| B | 30 | F |
| C | 40 | F |
| F | 30 | F |
| G | 50 | M |
| N | 30 | M |
| TARGET USER | 30 | F |

FIG. 6

| USER\CONTENT | Oc | St | Pr | Ko | Fi | Su | Ga | AGE | SEX DISTINCTION | CLUSTER |
|---|---|---|---|---|---|---|---|---|---|---|
| A | 1 | 1 | 0 | 0 | 0 | 0 | 0 | 20 | F | 1 |
| D | 1 | 1 | 0 | 0 | 1 | 0 | 1 | 20 | F | 1 |
| B | 0 | 1 | 1 | 1 | 0 | 0 | 0 | 30 | F | 1 |
| C | 0 | 1 | 1 | 1 | 0 | 0 | 0 | 40 | F | 2 |
| F | 0 | 0 | 1 | 1 | 0 | 1 | 0 | 30 | F | 2 |
| G | 1 | 0 | 0 | 0 | 1 | 1 | 1 | 50 | M | 3 |
| N | 1 | 0 | 0 | 0 | 1 | 0 | 1 | 30 | M | 3 |

FIG. 9

| CONTENT<br>ATTRIBUTE | Oc | St | Pr | Ko | Fi | Su | Ga |
|---|---|---|---|---|---|---|---|
| ANIMATION | Y | | | | | | Y |
| LOVE COMEDY | | | Y | Y | | | |
| ACTION | | Y | | | Y | Y | |

FIG. 16A

| | CONTENT PREFERENCE INFORMATION | | | | | | | PROFILE INFORMATION | |
|---|---|---|---|---|---|---|---|---|---|
| CONTENT ATTRIBUTE | Oc | St | Pr | Ko | Fi | Su | Ga | AGE | SEX DISTINCTION |
| ANIMATION | Y | | | | | | | | |
| LOVE COMEDY | | | Y | Y | | | | | |
| ACTION | | Y | | | Y | Y | | | |
| TARGET USER | ? | 1 | ? | ? | ? | ? | Y | 30 | F |

CONTENT-ATTRIBUTE VALUE (0,0,1)

FIG. 16B

CONTENT-PREFERENCE DEGREE = PARAMETER OF EACH CLUSTER × CONTENT-ATTRIBUTE VALUE

PREFERENCE DEGREE OF Fi IS CALCULATED USING SIMILAR CLUSTER W2
0×0+0.67×0+0.33×1=0.33

IN THE SAME WAY, PREFERENCE DEGREES OF ALL CONTENTS ARE CALCULATED.
(0, -, 0.67, 0.67, 0.33, 0.33, 0)
→ RECOMMEND "Pr", "Ko" AND SO ON

CONTENT ATTRIBUTE:
(ANIMATION, LOVE COMEDY, ACTION)

PARAMETER W1 OF CLUSTER 1 (0.5, 0, 0.5)
PARAMETER W2 OF CLUSTER 2 (0, 0.67, 0.33)
PARAMETER W3 OF CLUSTER 3 (0.57, 0, 0.43)

APPARATUS AND METHOD FOR RECOMMENDING INFORMATION, AND NON-TRANSITORY COMPUTER READABLE MEDIUM THEREOF

CROSS-REFERENCE TO RELATED APPLICATION

This application is based upon and claims the benefit of priority from Japanese Patent Application No. 2011-065265, filed on Mar. 24, 2011; the entire contents of which are incorporated herein by reference.

FIELD

Embodiments described herein relate generally to an apparatus and a method for recommending information, and a non-transitory computer readable medium thereof.

BACKGROUND

A conventional technique to store a user's preference information without a long time is proposed. In this technique, at an initialization, the user's preference information is easily extracted in a short time. In this case, under a condition without a viewing history or a recording history, immediately after the user begins to use the apparatus, programs reflecting the user's preference can be recommended.

BRIEF DESCRIPTION OF THE DRAWINGS

FIG. 5 is one example to input profile information according to the one embodiment.

FIG. 6 is one example of profile information of a plurality of users according to the one embodiment.

FIG. 9 is one example of a user cluster according to the one embodiment.

FIGS. 16A and 16B are examples of calculation of the content preference degree according to the one embodiment.

DETAILED DESCRIPTION

According to one embodiment, an information recommendation apparatus includes a first control unit, an acquisition unit, a clustering unit, a calculation unit, an estimation unit, and a decision unit. The first control unit is configured to register a profile information of a new user and items to be selected by the new user. Each item has an attribute value of a plurality of attributes. The acquisition unit is configured to acquire a profile information and a preference information of a plurality of users. The preference information represents whether each of the plurality of users has selected each item. The clustering unit is configured to classify the plurality of users into a plurality of clusters by using the profile information and the preference information of the plurality of users. The calculation unit is configured to calculate a parameter of each attribute of each cluster by using the preference information of users classified to each cluster. The estimation unit is configured to estimate a similar cluster to classify the new user from the plurality of clusters by using the profile information of the new user. The decision unit is configured to calculate a preference degree of each item by using the parameter of each attribute of the similar cluster and the attribute value of each item, and to decide an item to be recommended to the new user by using the preference degree.

Various embodiments will be described hereinafter with reference to the accompanying drawings.

As a technique to recommend preference items of users (of a user group) similar to a target user by using preference information of the user group, a collaborative filtering, a content base filtering and a profile base filtering, exists. As to the content base filtering, items similar to a target user's preference item are recommended by using the target user's preference information and item information. As to the profile base filtering, items matched with a target user's item information are recommended based on the target user's profile information. However, this technique is difficult to suitably recommend to a user (It is called "a new user") who newly utilizes the recommendation system. Accordingly, as to the present embodiment, information recommendation apparatus able to suitably recommend to the new user is explained.

Figure 1:
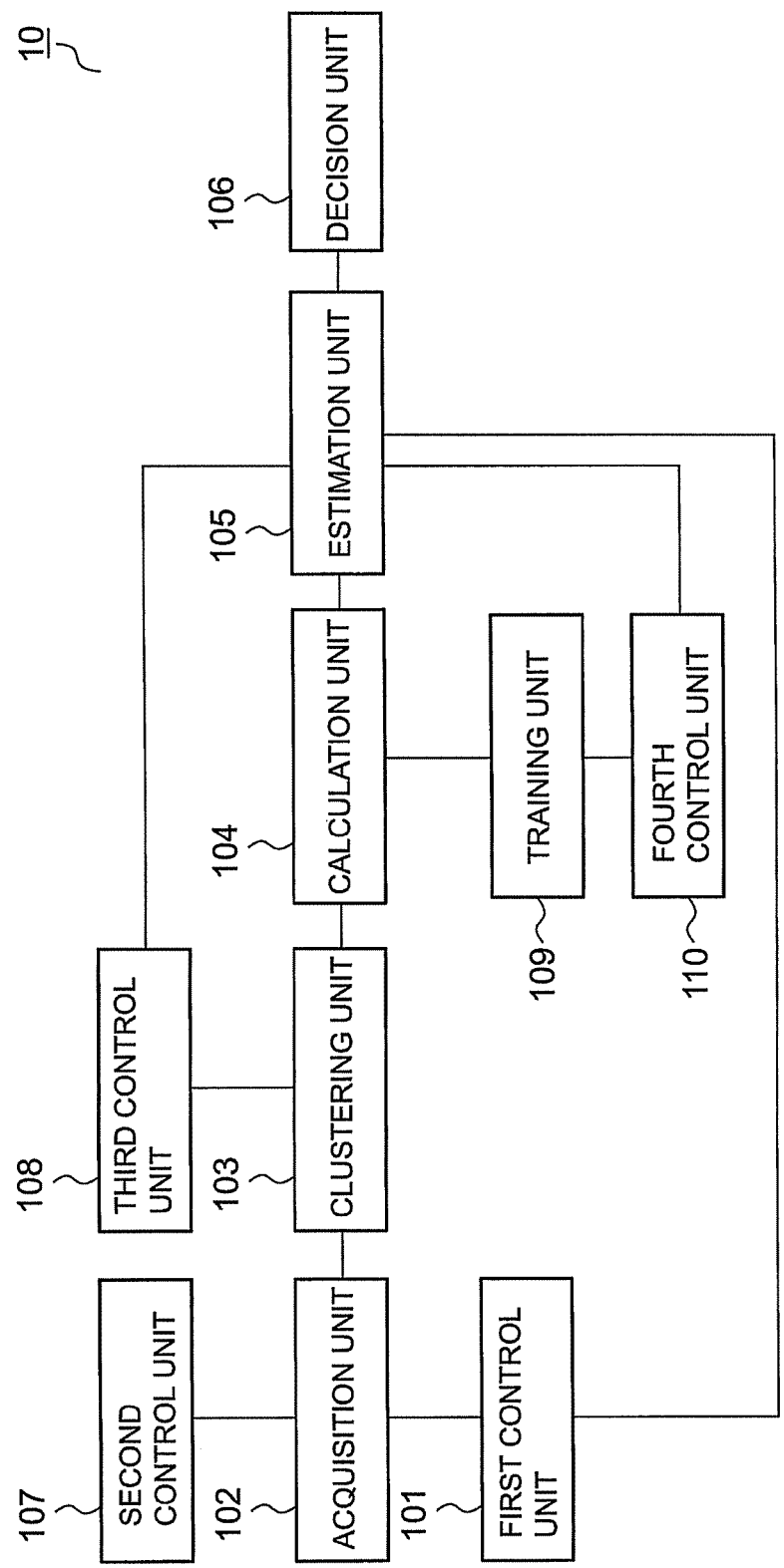
FIG. 1 is a block diagram of an information recommendation apparatus according to one embodiment.

FIG. 1 is a block diagram of an information recommendation apparatus 10 according to the present embodiment. The information recommendation apparatus 10 includes a first control unit 101, an acquisition unit 102, a clustering unit 103, a calculation unit 104, an estimation unit 105, a decision unit 106, a second control unit 107, a third control unit 108, a training unit 109, and a fourth control unit 110. The first control unit 101 controls profile information and items of selection target. The second control unit 107 controls preference information. The third control unit 108 controls information of a plurality of clustered sets. The fourth control unit 110 controls item-attribute parameters.

The first control unit 101 controls profile information and items of selection target of a new user. The profile information is set to cluster the new user. Furthermore, the first control unit 101 acquires profile information of a plurality of users via a server. The server controls the profile information of the plurality of users who respectively utilize an apparatus similar to the information recommendation apparatus.

The acquisition unit 102 acquires the profile information of the plurality of users from the first control unit. Furthermore, the acquisition unit 102 acquires preference information of the plurality of users via a server. The server controls the preference information of the plurality of users who respectively utilize an apparatus similar to the information recommendation apparatus.

The clustering unit 103 acquires the profile information and the preference information of the plurality of users from the acquisition unit 102, and clusters the plurality of users into a plurality of sets (Each set is called "a cluster"). Information (It is called "cluster information") related to each cluster is controlled by the third control unit 108.

The calculation unit 104 calculates a parameter of an attribute included in an item (acquired by the acquisition unit 102) for each cluster (classified by the clustering unit 103). The attribute included in the item is an index to discriminate the item, for example, information representing a genre of the item. If the item is a video, the attribute is "performers" and "author (or producer)" of the video. If the item is a book, the attribute is "writer" and "genre" of the book. In this case, the parameter of the attribute is called "an attribute parameter". The attribute parameter may be previously trained by the training unit 109. The attribute parameter (trained) of item is controlled by the fourth control unit 110. The attribute parameter previously trained is sent from the fourth control unit 110 in response to a request from the estimation unit 105.

By using profile information of a new user (acquired from the first control unit 101) and cluster information (acquired from the clustering unit 103), the estimation unit 105 estimates a set (It is called "a similar cluster") of the new user similar to other users. The cluster information may be acquired from the third control unit 108 based on necessity.

By using the attribute parameter of the similar cluster, the decision unit 106 calculates a preference degree of the new user for each item, and decides an item to be recommended (It is called "a recommended item"). The recommended item is sent to a presentation unit (not shown in FIG.) and presented to the new user. For example, if the recommended item is a video, the presentation unit is a display device to display the video, or a display attached to a controller to select the recommended item.

Figure 2:
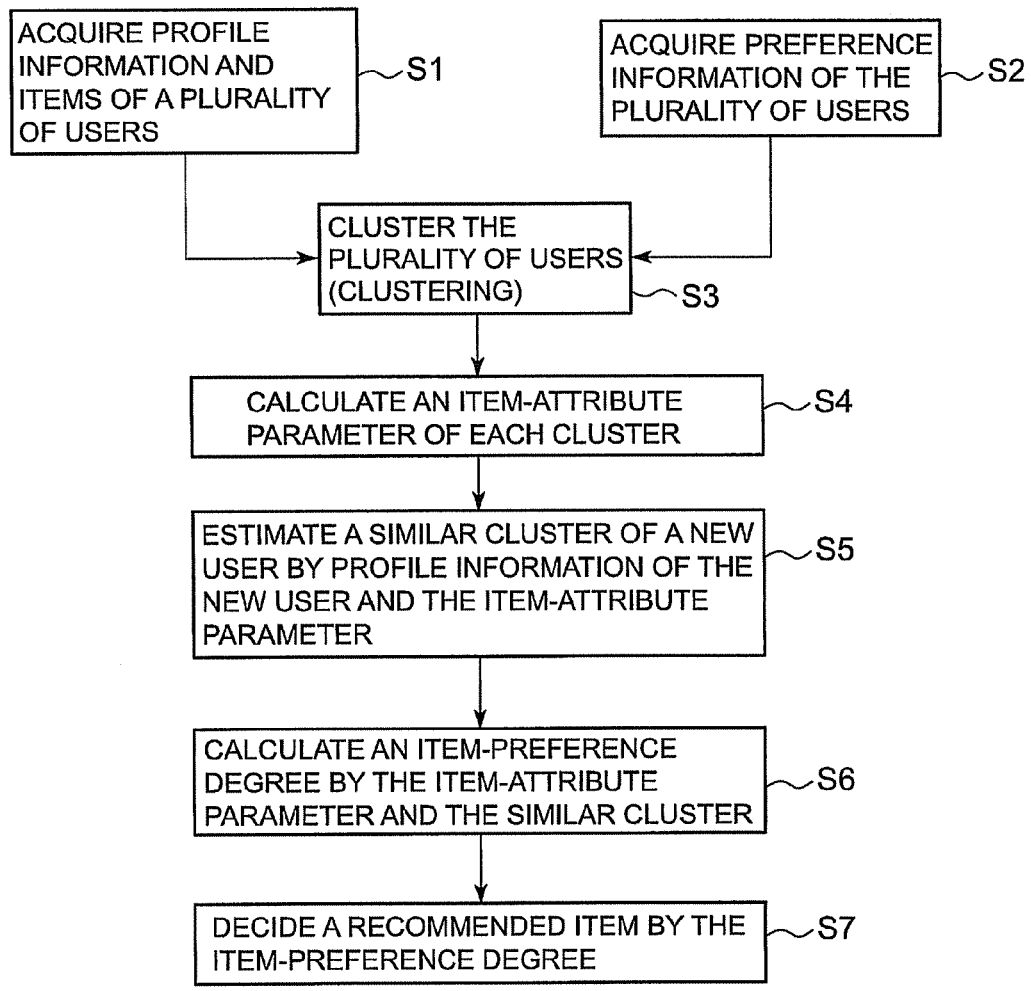
FIG. 2 is one example of the information recommendation apparatus.

Next, operation of each unit in the information recommendation apparatus of the present embodiment is explained by referring to FIG. 2.

First, the first control unit 101 acquires profile information and items of a plurality of users via a server (S1). In the same way, the acquisition unit 102 acquires preference information of the plurality of users (S2). By using the profile information, the items and the preference information of the plurality of users, the clustering unit 103 clusters the plurality of users (S3). For each cluster into which the plurality of users is classified, the calculation unit 104 calculates an item-attribute parameter (S4). The first control unit 101 acquires profile information of a new user, and calculates a similar cluster of the new user by using the item-attribute parameter and the new profile information of the new user (S5). The decision unit 106 calculates an item-preference degree of the new user by using the item-attribute parameter and the similar cluster (S6). Last, the decision unit 106 decides a recommended item by using the item-preference degree (S7).

Figure 3:
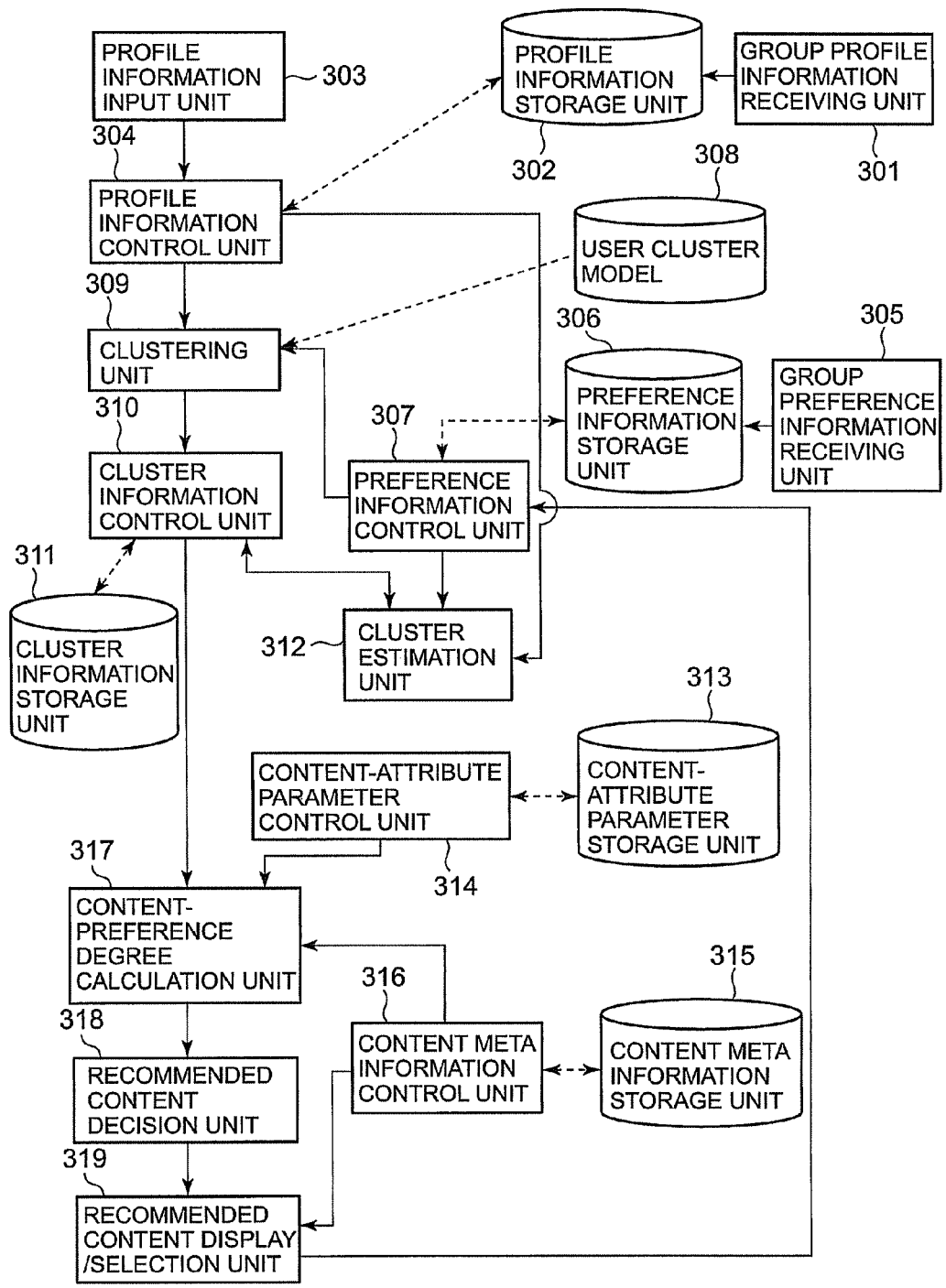
FIG. 3 is a block diagram of a video recommendation apparatus according to the one embodiment.

Next, detail of the information recommendation apparatus of the present embodiment is explained by referring to FIG. 3. In this case, an apparatus for recommending a video content is explained as one example of the information recommendation apparatus. As to this apparatus, a method for recommending a video matched with the user's preference is explained. However, recommended information may not be a video. The recommended information may be all general consumption products such as an image, music, life commodity or food. Furthermore, in this example an apparatus for distributing a video content is explained. However, a device for supplying contents able to operate and display the content may be used.

FIG. 3 is a component of the video recommendation apparatus of the present embodiment. In the video recommendation apparatus, as the first control unit 101, a profile information control unit 304 controls profile information of a new user who utilizes this apparatus. As the acquisition unit 102, a group profile information receiving unit 301 receives profile information of a plurality of users who utilizes this apparatus via a network. A profile information storage unit 302 stores the profile information received. A profile information input unit 303 inputs the new user's profile information if this information is not registered. A group preference information receiving unit 305 receives preference information of the plurality of users via the network. A preference information storage unit 306 stores the preference information received.

As the second control unit 107, a preference information control unit 307 controls the preference information of the plurality of users and the new user. As the clustering unit 103, a clustering unit 309 classifies the plurality of users into each cluster. A user cluster model 308 is previously stored for clustering. A cluster information control unit 310 controls a user cluster (generated by clustering) as cluster information. A cluster information storage unit 311 stores the cluster information. As the third control unit 108, a cluster estimation unit 312 estimates a cluster of the new user similar to another user by using the preference information and the profile information of the plurality of users. A content-attribute parameter storage unit 313 stores attribute parameters of contents.

As the calculation unit 104, a content-attribute parameter control unit 314 calculates a content-attribute parameter of each cluster, and controls them. A content meta information storage unit 315 stores the cluster information and meta information of contents. A content meta information control unit 316 controls the meta information.

As the decision unit 106, a content-preference degree calculation unit 317 calculates a content-preference degree of the new user by using the content meta information and the content-attribute parameter. Furthermore, as the decision unit 106, a recommended content decision unit 318 decides a recommended content (item) by using the content-preference degree. A recommended content display/selection unit 319 presents recommended contents and makes the new user select at least one from the recommended contents.

Figure 4:
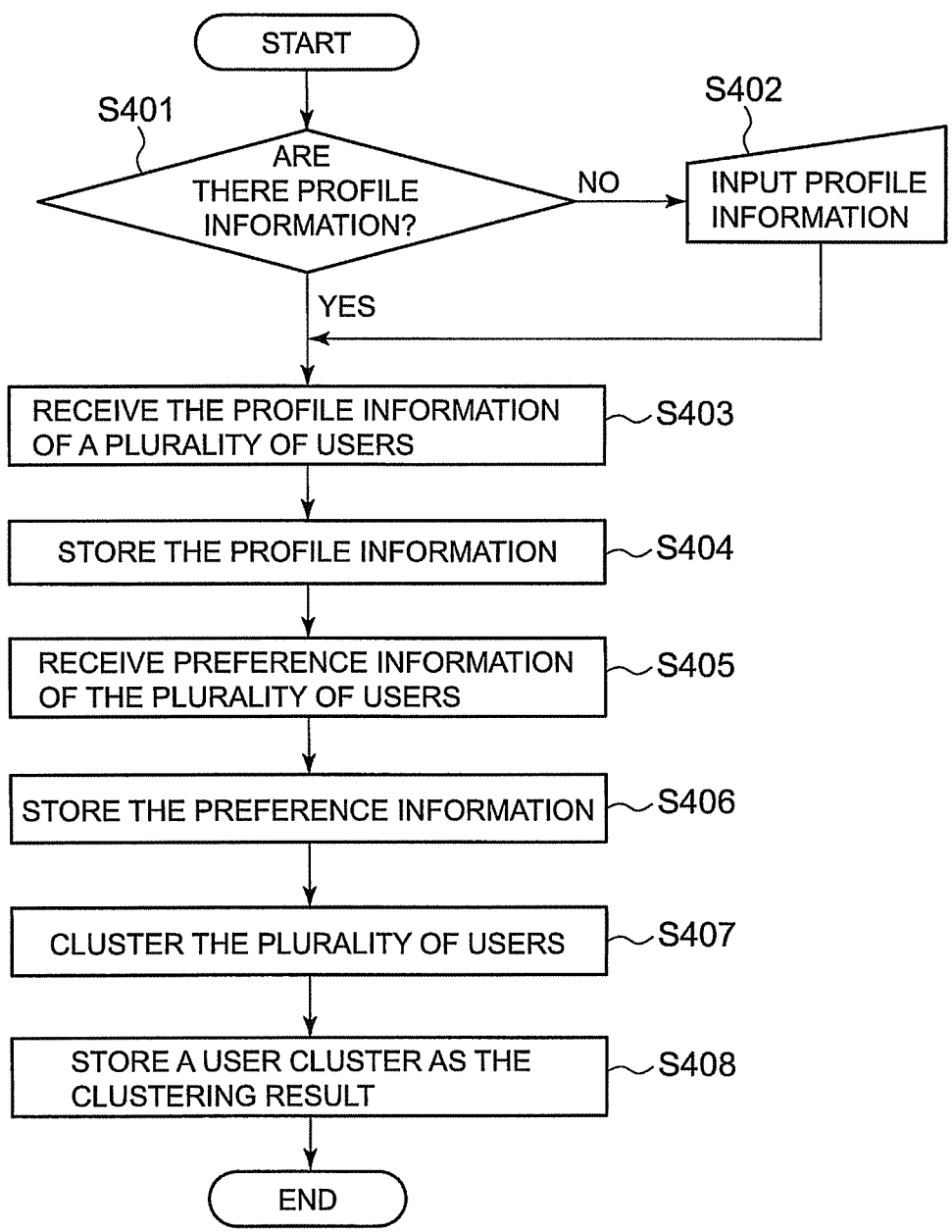
FIG. 4 is a flow chart of processing to create a user cluster according to the one embodiment.

Next, each function of the video recommendation apparatus is explained by referring to Figs. FIG. 4 is a flow chart of processing to create a user cluster. In the video recommendation apparatus, a user cluster (a cluster to which a new user belongs) is created by receiving content information displayable or acquiring input information from a plurality of users (who utilizes the similar apparatus). The user cluster may be previously created before determining the recommended content.

When profile information is not registered (No at S401), i.e., when a user newly utilizes the apparatus, the profile information input unit 303 requests the user to input profile information (S402). The profile information is attribute information of the user such as sex distinction and age. For example, as shown in FIG. 5, the profile information is collected via an input screen to query the user's sex distinction and age. The profile information is not limited to this example. If possible, a genre of video content or a content distribution source often utilized by the user may be acquired by various formats or definitions. Furthermore, the profile information may be inputted by using a key board or a remote controller. If interactive processing with the user is possible, the profile information may be inputted by on-line using a network. Furthermore, as to minimum information having a predetermined format, this information may be read from a magnetic tape or a flash memory as an information transfer medium.

On the other hand, if user profile information is already registered (Yes at S401), input of profile information is accepted in response to a request to update from the user. The profile information control unit 304 stores the user profile information (acquired via the profile information input unit 303) into the profile information storage unit 302.

Furthermore, the group profile information receiving unit 301 receives group profile information of a plurality of users (stored in the server side) via a circuit such as an Internet (S403). The profile information control unit 304 stores the group profile information (acquired by the group profile information receiving unit 301) into the profile information storage unit 302 (S404). For example, as shown in FIG. 6, the group profile information of a plurality of users of which ages and sex distinctions are recorded is acquired.

Figure 7:
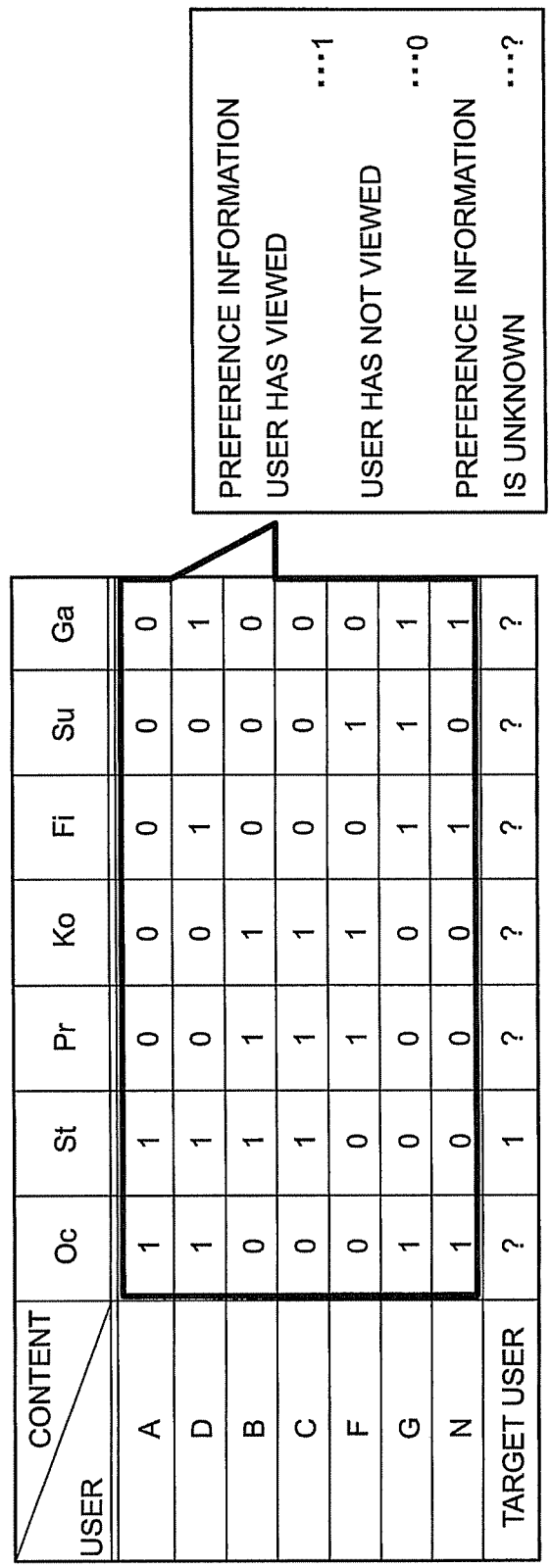
FIG. 7 is one example of preference information of a plurality of users according to the one embodiment.

The group preference information receiving unit 305 receives group preference information (stored in the server side) via a circuit such as an Internet (S405). The preference information control unit 307 stores the group preference information (acquired by the group preference information receiving unit 305) into the preference information storage unit 306 (S406). For example, the preference information shown in FIG. 7 is stored. In this example, a plurality of users (A, D, B, C, F, G, N) and video information (content ID: $O_c$, $S_t$, $P_r$, $K_o$, $F_i$, $S_u$, $G_a$) are shown. As to a content selected by a user, if the content was already viewed by the user, "1" is recorded. If the content was not viewed yet by the user, "0" is recorded. If the user's preference information for the content is unknown, "?" is recorded. In this example, viewing (or non-viewing) is represented by "1" and "0". However, any method for representing the viewing (non-viewing) or viewing information itself may be utilized. Furthermore, the user may specially input the preference information via an input unit. Alternatively, by previously recording the user's viewing history, it may be acquired by up-loading to a server.

By using on the group preference information (acquired from the preference information control unit 307), the group profile information (acquired from the profile information control unit 304) and a user cluster model (acquired from the user cluster model storage unit 308), the clustering unit 309 classifies the plurality of users into a plurality of groups (clusters) (S407).

Figure 8:
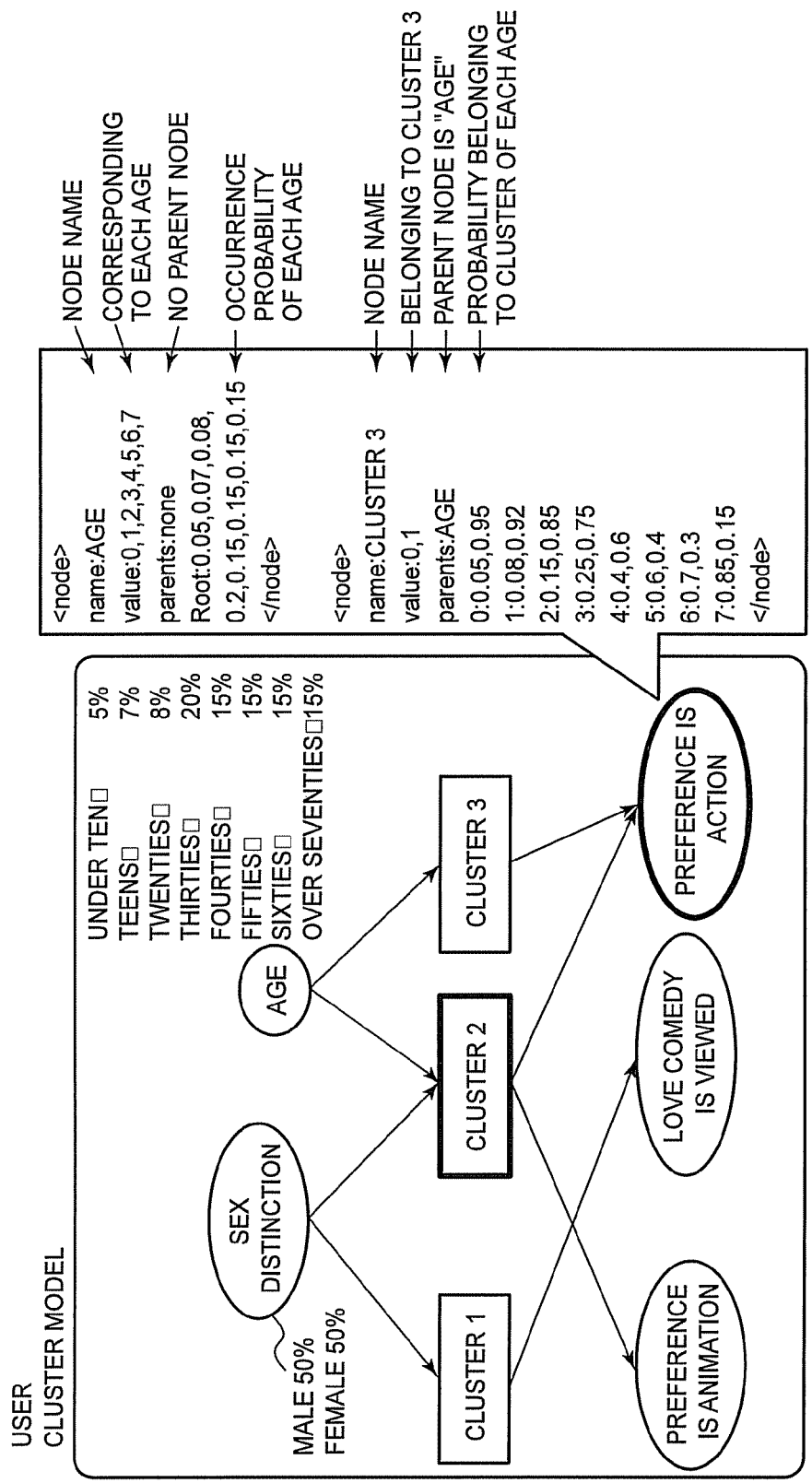
FIG. 8 is one example of a user cluster model according to the one embodiment.

For example, as shown in FIG. 8, the user cluster model is represented by Bayesian network. In the user cluster model of FIG. 8, a probability that a user belongs to each cluster is calculated by using sex distinction and age thereof (acquired from the profile information). Then, the user is classified into a cluster having the highest probability. In the present embodiment, by clustering seven users shown in FIG. 7 into three user groups shown in FIG. 9, cluster information is acquired. In this example, the user cluster model is described by using the Bayesian network. However, a method for describing the model is not limited to this example. Furthermore, in this example, a plurality of users is classified into each cluster by using the user cluster model previously created by a person. However, by using a user clustering method such as k-means, the user cluster model may be automatically created by a computer.

The cluster information control unit 310 stores the cluster information (created by the clustering unit 309) into the cluster information storage unit 311 (S408). If the cluster information is already stored in the cluster information storage unit 311, a database of cluster information is updated.

Figure 10:
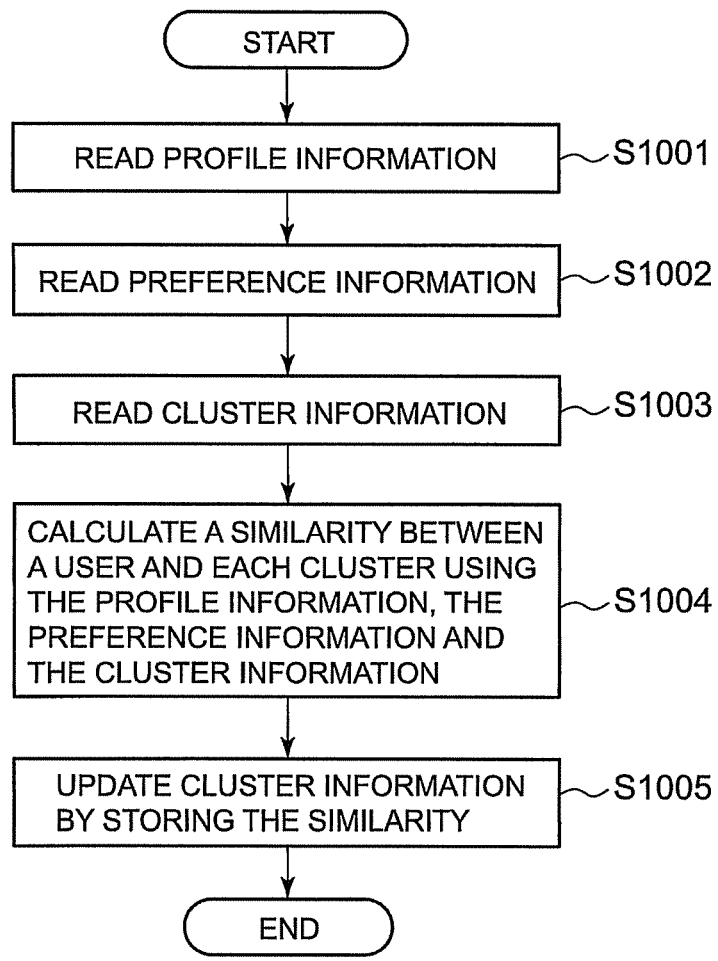
FIG. 10 is a flow chart of processing to estimate a similar cluster according to the one embodiment.

Next, the cluster estimation unit 312 to estimate a cluster (similar cluster) similar to user information of new user is explained. FIG. 10 is a flow chart of processing to estimate the similar cluster. The cluster estimation unit 312 reads the profile information acquired from the profile information control unit 304 (S1001), the preference information acquired from the preference information control unit 307 (S1002), and the cluster information acquired from the cluster information control unit 310 (S1003). By using the profile information, the preference information and the cluster information, the cluster estimation unit 312 calculates a similarity between the user and each cluster (S1004).

Figure 11A:
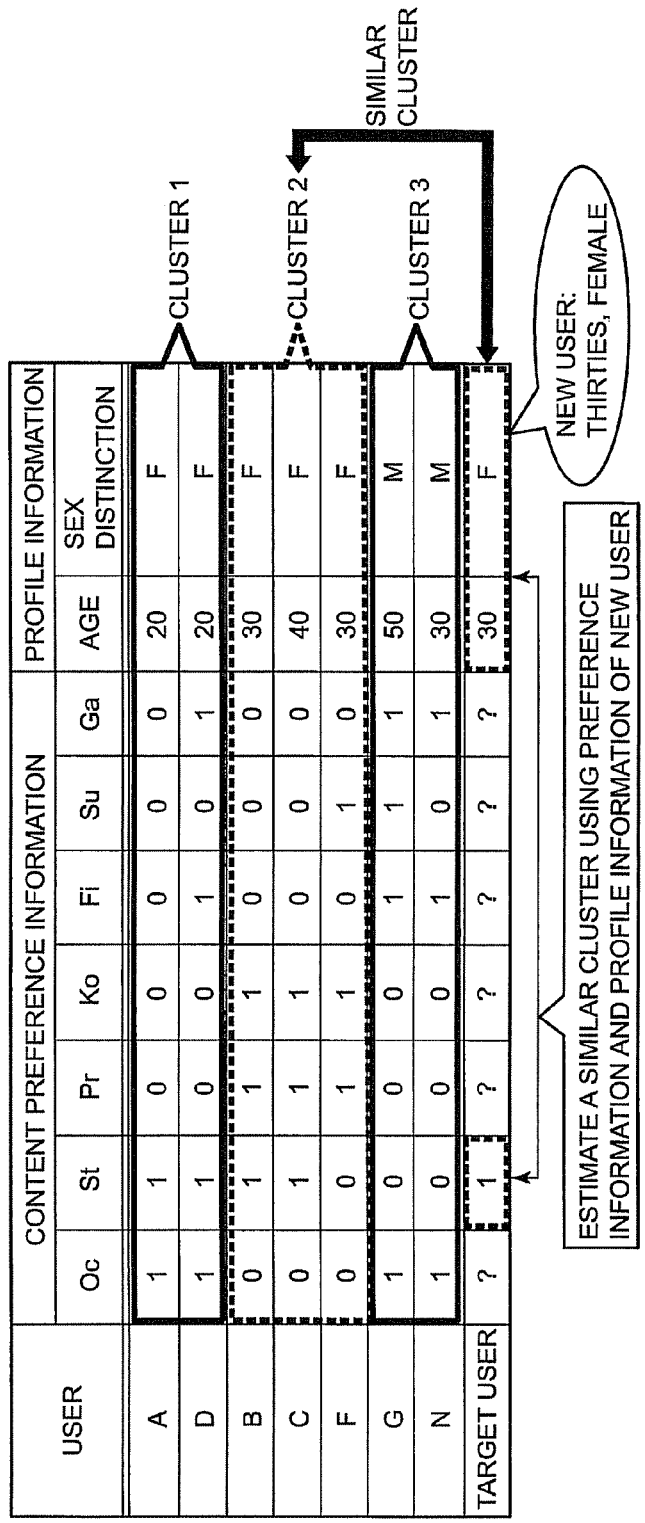
FIGS. 11A and 11B are examples to calculate similarity with each cluster according to the one embodiment.
Figure 11B:
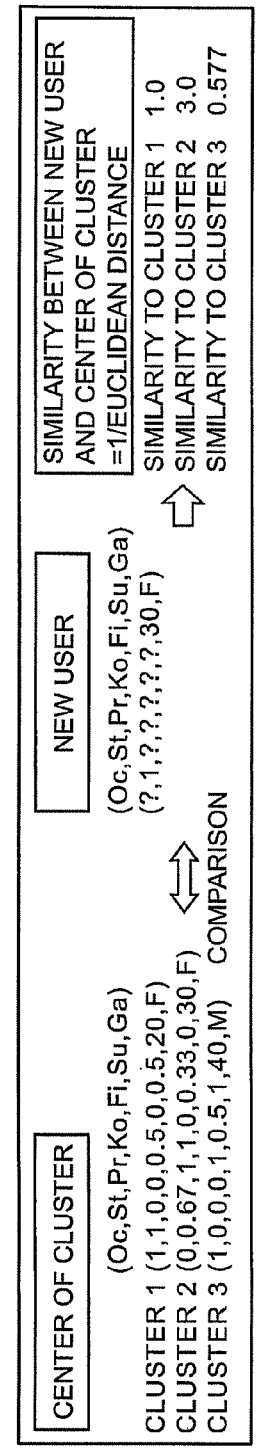

In this case, as to a user (new user) who newly begins to utilize, preference information thereof is few. Accordingly, in addition to the group profile information (of a plurality of users), by using the group preference information (of the plurality of users), the similarity is calculated. FIGS. 11A and 11B show one example that a similarity between the new user and each cluster to which another user belongs is calculated. In FIG. 11A, users (A, D, B, C, F, G, N) and a target user (new user) are shown. As profile information of each user, information of age and sex distinction is acquired. Two users (A, D) belong to a cluster 1, three users (B, C, F) belong to a cluster 2, and two users (G, N) belong to a cluster 3. As a kind of content, content ID is ($O_c$, $S_t$, $P_r$, $K_o$, $F_i$, $S_u$, $G_a$). As to each of seven contents, if a user has viewed, "1" is recorded in a square corresponding to the user and the content. If a user has not viewed, "0" is recorded in a square corresponding to the user and the content. If viewing information of the user is unknown, "0" is recorded in a square corresponding to the user and the content.

As shown in FIG. 11B, in order to calculate a similarity between the new user and each cluster, a center of cluster is calculated by using the preference information of users (belonging to each cluster) and the profile information. As to seven contents ($O_c$, $S_t$, $P_r$, $K_o$, $F_i$, $S_u$, $G_a$), a center of cluster 1 is (1, 1, 0, 0, 0.5, 0, 0.5, 20, F), a center of cluster 2 is (0, 0.67, 1, 1, 0, 0.33, 0, 30, F), and a center of cluster 3 is (1, 0, 0, 0, 1, 0.5, 1, 40, M). The center of cluster is used for comparing the new user to preference information of users belonging to each cluster. Accordingly, as the center of cluster, a mean-value, a median, or a weighted average, are used.

Then, Euclidean distance between the center of each cluster and preference information and profile information of the new user is calculated, and a reciprocal of the Euclidean distance is calculated as the similarity. In this case, the preference information and the profile information of the new user (target user) is (?, 1, ?, ?, ?, ?, ?, 30, F). As a result, the similarity between the new user and cluster 1, 2 and 3 is 1.0, 3.0, and 0.577 respectively. Accordingly, the cluster 2 is estimated as a similar cluster of the new user. In this example, the reciprocal of the Euclidean distance is used. However, any method for calculating a similarity between the new user and each cluster may be utilized.

In above-mentioned example, the case that preference information of a new user is few is explained. Even if there is no preference information of the new user, by using profile information of the new user, a similar cluster of the new user can be determined in the same way. In this case, by using profile information of the new user and group profile information of a plurality of users, the similar cluster is determined.

The cluster information control unit 310 stores the similarity (calculated by the cluster estimation unit 312) between the new user and each cluster into the cluster information storage unit 311. If the similarity of the new user is already stored in the cluster information storage unit 311, a database of cluster information is updated (S1005). By introducing the user profile information, an accuracy to estimate a similar cluster can be raised from few information.

Figures 12, 13:
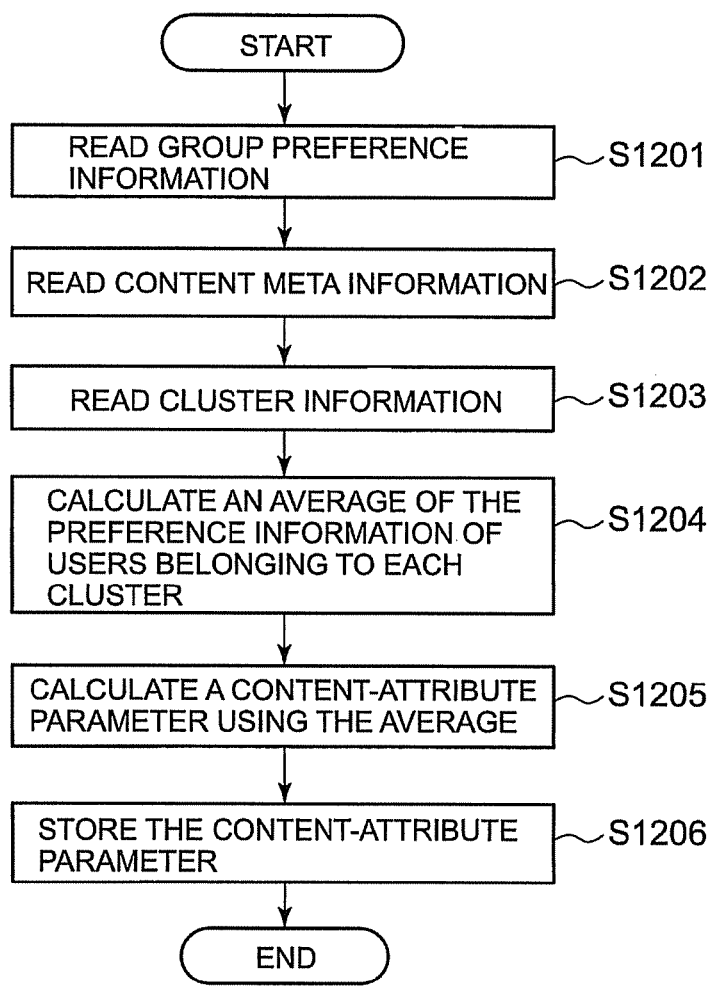
FIG. 12 is a flow chart of processing to calculate a content-attribute parameter according to the one embodiment.
FIG. 13 is one example of content attributes according to the one embodiment.

Next, processing to estimate the similar content is explained in detail. As a content-attribute parameter, prepared one may be used. In the present embodiment, the content-attribute parameter previously trained by the training unit 109 is used. FIG. 12 is a flow chart of processing to calculate the content-attribute parameter. As to training of the content-attribute parameter, the training unit 109 reads the group preference information acquired from the preference information control unit 307 (S1201), the content meta information acquired from the content meta information control unit 316 (S1202), and the cluster information acquired from the cluster information control unit 310 (S1203). In this case, content meta information is acquired from a content information receiving unit (not shown in FIG. 3) to receive content information (stored in the server side) via a circuit such as an Internet. Alternatively, the content meta information may be inputted from various media (such as a CD (Compact Disc), a DVD (Digital Versatile Disc), a flash-memory) to transfer information to the apparatus.

Furthermore, the content-attribute acquired from the content meta information is, for example, as shown in FIG. 13, genre information (animation, love comedy, action) of the content.

The explanation is returned to FIG. 12. the training unit 109 calculates an average of content preference information of users belonging to each cluster (S1204), and calculates a content-attribute parameter by smoothing a weighted sum of the average and a content attribute (S1205). For example, by using the weighted sum based on the average and an occurrence frequency of preference attribute, the content-attribute parameter may be calculated. Moreover, various methods for calculating the content-attribute parameter are applied, i.e., an arbitrary method thereof may be used. The content-attribute parameter control unit 314 stores the content-attribute parameter (calculated by the training unit 109) into the content-attribute parameter storage unit 313 (S1206). If the content-attribute parameter is already stored in the content-attribute parameter storage unit 313, the content-attribute parameter of a database thereof is updated.

Figures 14A, 14B:
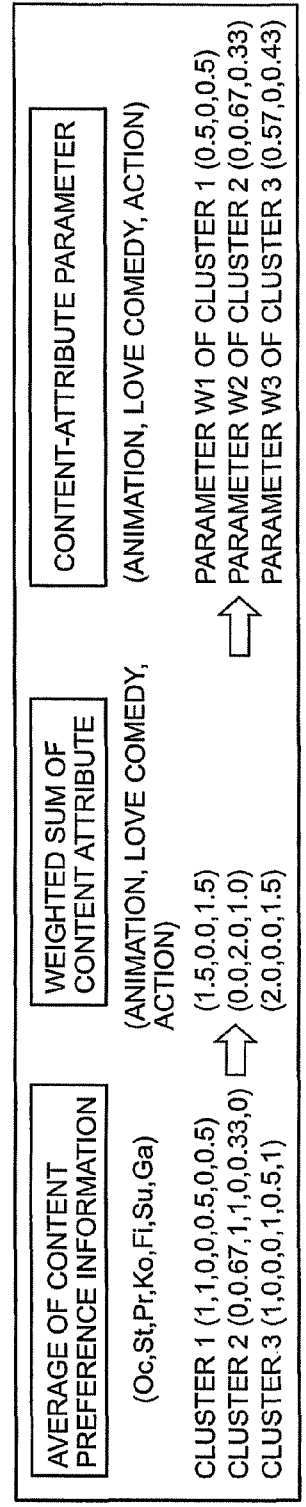
FIGS. 14A and 14B are examples of the content-attribute parameter according to the one embodiment.

FIGS. 14A and 14B are detail calculation processing of content-attribute parameters in the case that clusters shown in FIG. 11A and content attributes shown in FIG. 13 are acquired. For example, by calculating an average of content preference information ($O_c$, $S_t$, $P_r$, $K_o$, $F_i$, $S_u$, $G_a$) for each cluster, the average of cluster 1 is (1, 1, 0, 0, 0.5, 0, 0.5), the average of cluster 2 is (0, 0.67, 1, 1, 0, 0.33, 0), and the average of cluster 3 is (1, 0, 0, 0, 1, 0.5, 1). On the other hand, by calculating a weighted sum of the average and the content attribute for each cluster, the weighted average of cluster 1 is (1.5, 0.0, 1.5), the weighted average of cluster 2 is (0.0, 2.0, 1.0), the weighted average of cluster 3 is (2.0, 0.0, 1.5). Furthermore, the content-attribute parameter is calculated so that a sum of parameter of each cluster is equal. For example, in FIG. 14B, the content-attribute parameter is calculated so that the sum is "1". In this case, a value of the sum may be arbitrary set. In this way, parameter W1 of cluster 1 is (0.5, 0, 0.5), parameter W2 of cluster 2 is (0, 0.67, 0.33), parameter W3 of cluster 3 is (0.57, 0, 0.43).

Figure 15:
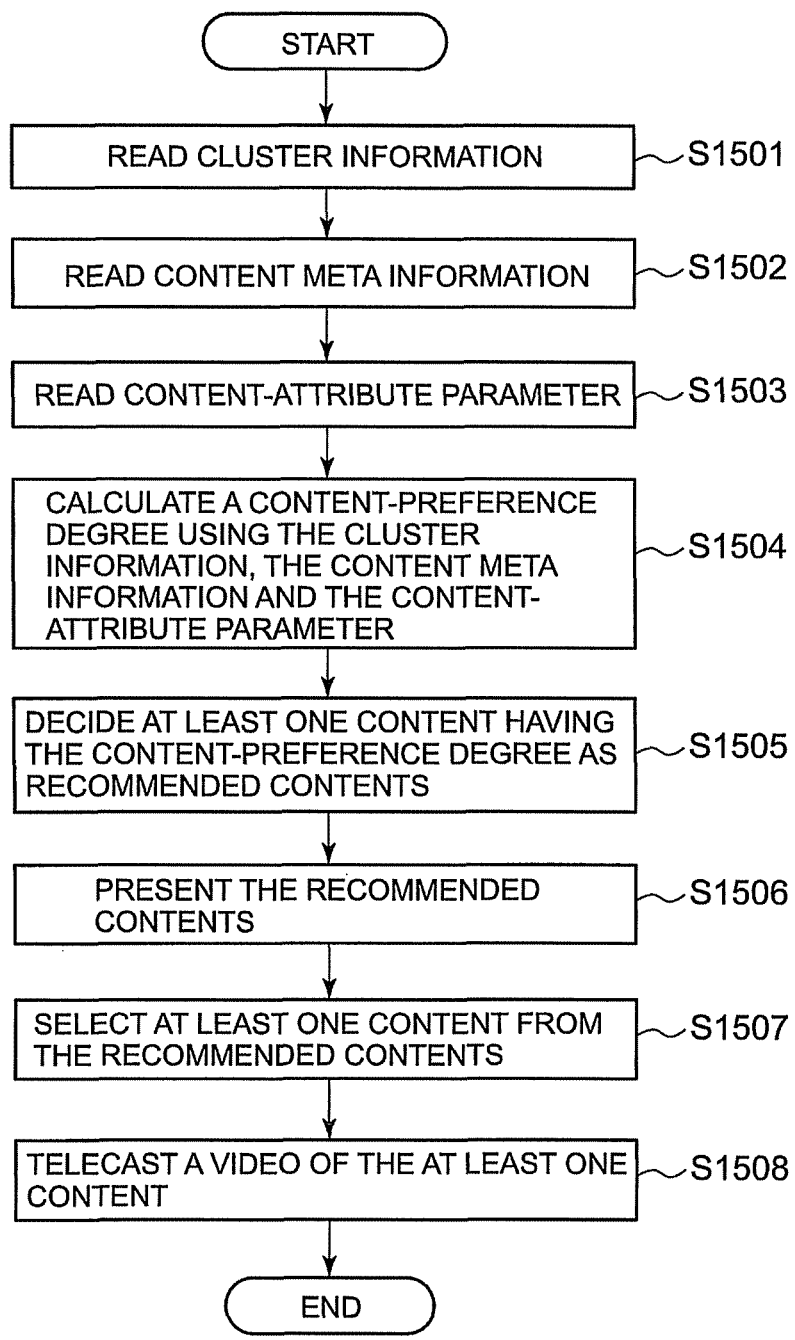
FIG. 15 is a flow chart of processing to calculate a content preference degree and to decide a recommended content according to the one embodiment.

Next, processing to calculate a content-preference degree and to decide a recommended content is explained by referring to FIG. 15. The decision unit 105 (the content-preference degree calculation unit 317) reads the cluster information acquired from the cluster information control unit 310 (S1501), the content meta information acquired from the content meta information control unit 316 (S1502) and the content-attribute parameter acquired from the content-attribute parameter control unit 314 (S1503), and calculates a content-preference degree for a user by using them (S1504). For example, as shown in FIGS. 16A and 16B, as to an item not having the user's preference information, the content-preference degree is calculated as a product of a content-attribute value of the item and the content-attribute parameter of a cluster most similar to the user's preference. The content-attribute value is acquired from the content meta information.

In FIG. 16A, the content-attribute value acquired from genre information is shown. For example, the content-attribute value of content Fi is (0, 0, 1). As to cluster 2, the content-attribute value of content Fi is "0.33" (=0×0+0.67× 0+0.33×1). As to the content-preference degree, various methods for calculating can be used. For example, an arbitrary method for raising the content-preference degree of a content having attribute values similar to a content viewed by the user may be used.

The decision unit 106 (the recommended content decision unit 318) determines at least one content (item) having a large value of the content-preference degree (calculated by the content preference degree calculation unit 317) as a content to be recommended to the user (S1505). In order to determine the recommended content, a condition that contents have the content-preference degree larger than an arbitrary threshold, or a condition that the number of contents is arbitrary, is set. In FIG. 16B, the content-preference degrees (calculated by the content-preference degree calculation unit 317) of all contents (all items) are compared each other, and two contents $P_r$ and $K_o$ having the largest preference degree are decided as the recommended content.

The recommended content display/selection unit 319 presents recommended contents (decided by the recommended content decision unit 318) to a display unit (not shown in FIG. 3) by using the content meta information acquired from the content meta information control unit 316 (S1506). When the user selects at least one (the user's desired one) from the recommended contents displayed (S1507), the video apparatus acquires a video of the at least one content from a content information receiving unit (not shown in FIG. 3) to receive content information (stored in the server side) via a circuit such as an Internet, and telecasts the video (S1508). The recommended content display/selection unit 319 sends content information (of the at least one content) to the preference information control unit 307. The preference information control unit 307 stores the content information into the preference information storage unit 306. The video information may not be acquired from the server side via the circuit such as the Internet. The video information may be inputted from various media (such as a CD, a DVD, a flash-memory) to transfer information to the apparatus.

When the preference information is updated, by updating preference information stored in each unit of the information recommendation apparatus, the recommended content can be determined. For example, based on the user's new preference information, the second control unit 107 (the preference information control unit 307) may update the preference information of each user stored in the preference information storage unit 306. Furthermore, the calculation unit 104 (the content-attribute parameter control unit 314) may update the content meta information, or calculate the content-attribute parameter based on update of the preference degree.

Furthermore, when the preference information is updated, in addition to profile information of a new user (target user), the estimation unit 105 may estimate by using the new user's preference information. In this case, if items selected (contents already viewed) by the new user are included in preference information of each cluster and if the number of the items is larger than a predetermined number, the clustering unit 103 (the clustering unit 309) executes clustering of a plurality of users (belonging to the group) again, and the calculation unit 104 (the content-attribute parameter control unit 314) calculates the content-attribute parameter of each cluster again. Furthermore, the calculation unit (the content-attribute parameter control unit 314) may calculate the content-attribute parameter by using only preference information of the new user.

In the present embodiment, the information recommendation apparatus has a hardware component utilizing a regular computer. The hardware component includes a control device such as a CPU (Central Processing Unit), a storage device such as a ROM (Read Only Memory) and a RAM (Read Access Memory), a communication I/F to communicate by connecting to a network, an external storage device such as a drive device, a display device to present for recommending information, an input device such as a keyboard and a mouse for an operator to execute discrimination processing and result-acquisition processing, and a bus connecting each device.

In the present embodiment, a recommendation processing program executed by the information recommendation program can be stored and supplied as a file having executable format or installable format. For example, the recommendation processing program is stored in a computer-readable recording medium such as a CD-ROM (Compact Disc Read Only Memory), a FD (Flexible Disc), a CD-R (Compact Disk Recordable) or a DVD (Digital Versatile Disk).

Furthermore, the recommendation processing program may be stored in a computer connected to a network such as an Internet, and supplied by downloading via the network. Furthermore, the recommendation processing program may be supplied or distributed via the network such as the Internet.

Furthermore, the recommendation processing program may be previously installed into the ROM (and so on) to be supplied.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for recommending information, the apparatus comprising:
an acquisition unit executed by a processor, configured to acquire a profile information and a preference information of a plurality of users, the profile information being a personal information of each of the plurality of users, the preference information representing whether each of the plurality of users has selected each of a plurality of items, each item including an attribute value of each of a plurality of attributes;
a clustering unit executed by the processor, configured to classify the plurality of users into a plurality of clusters by using the profile information of the plurality of users;
a calculation unit executed by the processor, configured to calculate a parameter of each attribute of each cluster by using the preference information of users classified to each cluster and the attribute value of each attribute of each item;
a first control unit executed by the processor, configured to register into a memory, a profile information of a new user, the new user not being included in the plurality of users;
an estimation unit executed by the processor, configured to estimate a similar cluster to classify the new user from the plurality of clusters by using the profile information of the new user; and
a decision unit executed by the processor, configured to calculate a preference degree of each item by using the parameter of each attribute of the similar cluster and the attribute value of each attribute of each item, and to decide an item to be recommended to the new user by using the preference degree.

2. The apparatus according to claim 1, further comprising:
a second control unit executed by the processor, configured to store the preference information of the new user; wherein
the second control unit updates the preference information when a new preference information of the new user is acquired, and
the calculation unit calculates the parameter of each attribute included in the items updated by the new preference information.

3. The apparatus according to claim 2, wherein
the estimation unit estimates the similar cluster by using the preference information of the new user with the profile information of the new user.

4. The apparatus according to claim 1, wherein,
if the number of the items included in the preference information of each cluster is larger than a predetermined number,
the clustering unit classifies the plurality of users again, and
the calculation unit calculates the parameter of each attribute of each cluster again.

5. The apparatus according to claim 1, wherein,
if the number of the items included in the preference information of the new user is larger than a predetermined number,
the calculation unit calculates the parameter of each attribute of each cluster by using the preference information of the new user only.

6. The apparatus according to claim 1, wherein
the calculation unit calculates an average of each item included in the preference information of users classified to the similar cluster, and calculates the parameter of each attribute of the similar cluster by using a weighted sum of the average and an occurrence frequency of each attribute in each item.

7. The apparatus according to claim 1, further comprising:
a third control unit executed by the processor, configured to store into the memory, an information of the plurality of clusters into which the plurality of users is classified.

8. The apparatus according to claim 1, further comprising:
a fourth control unit executed by the processor, configured to store into the memory the parameter of each attribute of each cluster.

9. The apparatus according to claim 1, further comprising:
a presentation unit configured to present the item to be recommended to the new user.

10. A method for recommending information, the method comprising:
acquiring by a processor, a profile information and a preference information of a plurality of users, the profile information being a personal information of each of the plurality of users, the preference information representing whether each of the plurality of users has selected each of a plurality of items, each item including an attribute value of each of a plurality of attributes;

classifying by the processor, the plurality of users into a plurality of clusters by using the profile information of the plurality of users;

calculating by the processor, a parameter of each attribute of each cluster by using the preference information of users classified to each cluster and the attribute value of each attribute of each item;

registering by the processor into a memory, a profile information of a new user, the new user not being included in the plurality of users;

estimating by the processor, a similar cluster to classify the new user from the plurality of clusters by using the profile information of the new user;

calculating by the processor, a preference degree of each item by using the parameter of each attribute of the similar cluster and the attribute value of each attribute of each item;

deciding by the processor, an item to be recommended to the new user by using the preference degree.

11. A non-transitory computer readable medium that stores a program for causing a computer to perform a method for recommending information, the method comprising:

acquiring a profile information and a preference information of a plurality of users, the profile information being a personal information of each of the plurality of users, the preference information representing whether each of the plurality of users has selected each of a plurality of items, each item including an attribute value of each of a plurality of attributes;

classifying the plurality of users into a plurality of clusters by using the profile information of the plurality of users;

calculating a parameter of each attribute of each cluster by using the preference information of users classified to each cluster and the attribute value of each attribute of each item;

registering a profile information of a new user, the new user not being included in the plurality of users;

estimating a similar cluster to classify the new user from the plurality of clusters by using the profile information of the new user;

calculating a preference degree of each item by using the parameter of each attribute of the similar cluster and the attribute value of each attribute of each item;

deciding an item to be recommended to the new user by using the preference degree.

\* \* \* \* \*